US008560587B2

(12) United States Patent
Schneider

(10) Patent No.: US 8,560,587 B2
(45) Date of Patent: Oct. 15, 2013

(54) NON-LINEAR MIXING OF PSEUDO-RANDOM NUMBER GENERATOR OUTPUT

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1169 days.

(21) Appl. No.: 12/125,833

(22) Filed: May 22, 2008

(65) Prior Publication Data

US 2009/0292751 A1 Nov. 26, 2009

(51) Int. Cl.
G06F 7/58 (2006.01)

(52) U.S. Cl.
USPC .......................................................... 708/250

(58) Field of Classification Search
None
See application file for complete search history.

(56) References Cited

U.S. PATENT DOCUMENTS

| | | | |
|---|---|---|---|
| 4,157,454 A | 6/1979 | Becker | |
| 5,003,597 A | 3/1991 | Merkle | |
| 5,214,703 A | 5/1993 | Massey et al. | |
| 5,361,323 A | 11/1994 | Murata et al. | |
| 5,619,576 A | 4/1997 | Shaw | |
| 5,724,428 A | 3/1998 | Rivest | |
| 5,799,088 A | 8/1998 | Raike | |
| 6,061,449 A | 5/2000 | Candelore et al. | |
| 6,122,379 A | 9/2000 | Barbir | |
| 6,247,112 B1 | 6/2001 | Seki | |
| 6,523,114 B1 | 2/2003 | Barton | |
| 6,560,338 B1 | 5/2003 | Rose et al. | |
| 6,999,588 B1 | 2/2006 | Oishi | |
| 7,103,181 B2 | 9/2006 | Ananth | |
| 7,263,540 B1 * | 8/2007 | Kuehnel | 708/256 |
| 7,328,228 B2 * | 2/2008 | Klein et al. | 708/250 |
| 7,795,899 B1 | 9/2010 | Grohoski et al. | |
| 7,925,009 B2 | 4/2011 | Schneider | |
| 7,945,049 B2 | 5/2011 | Schneider | |
| 7,962,540 B2 * | 6/2011 | Michaels et al. | 708/250 |
| 8,265,272 B2 | 9/2012 | Schneider | |
| 8,358,781 B2 | 1/2013 | Schneider | |
| 8,416,947 B2 | 4/2013 | Schneider | |
| 2001/0029608 A1 | 10/2001 | Nagashima et al. | |
| 2001/0033656 A1 | 10/2001 | Gligor et al. | |
| 2002/0054679 A1 | 5/2002 | Vesely | |
| 2002/0124033 A1 * | 9/2002 | Takahashi | 708/250 |
| 2002/0136406 A1 | 9/2002 | Fitzhardinge et al. | |
| 2003/0048728 A1 | 3/2003 | Kuribayashi et al. | |
| 2003/0048899 A1 | 3/2003 | Spacey | |
| 2003/0059040 A1 | 3/2003 | Rose et al. | |
| 2003/0217268 A1 | 11/2003 | Gantman | |
| 2004/0120518 A1 | 6/2004 | Macy et al. | |
| 2004/0215686 A1 | 10/2004 | Yoon et al. | |

(Continued)

OTHER PUBLICATIONS

Red Hat Notice of Allowance for U.S. Appl. No. 11/807,261 mailed Dec. 14, 2010.

(Continued)

*Primary Examiner* — David H Malzahn
(74) *Attorney, Agent, or Firm* — Lowenstein Sandler LLP

(57) ABSTRACT

A method and apparatus for a pseudo-random number generation system. The pseudo-random number generation mixes the output of two or more pseudo-random number generators to create a new pseudo-random number or sequence. The process operates on pseudo-random numbers with a bit size k, multiplies the numbers and then performs modulo $2^k+1$ on the result of the multiplication. This process can be performed quickly and with minimal computing resources, while improving the quality of the randomness of the output.

22 Claims, 6 Drawing Sheets

(56) References Cited

U.S. PATENT DOCUMENTS

| | | | |
|---|---|---|---|
| 2005/0065955 | A1 | 3/2005 | Babikov et al. |
| 2005/0097153 | A1* | 5/2005 | Dirscherl et al. ............ 708/250 |
| 2005/0131961 | A1 | 6/2005 | Margolus |
| 2005/0177727 | A1 | 8/2005 | Moskowitz et al. |
| 2005/0246215 | A1 | 11/2005 | Rackham |
| 2006/0126843 | A1 | 6/2006 | Brickell et al. |
| 2006/0129419 | A1 | 6/2006 | Flaxer et al. |
| 2006/0156187 | A1 | 7/2006 | Wu et al. |
| 2007/0076890 | A1 | 4/2007 | Muresan et al. |
| 2007/0237327 | A1 | 10/2007 | Taylor et al. |
| 2008/0069342 | A1 | 3/2008 | Relyea |
| 2008/0109501 | A1 | 5/2008 | Douguet et al. |
| 2008/0130876 | A1 | 6/2008 | Etienne et al. |
| 2008/0292096 | A1 | 11/2008 | Schneider |
| 2008/0298583 | A1 | 12/2008 | Ahmed |
| 2008/0307024 | A1* | 12/2008 | Michaels et al. ............ 708/250 |
| 2009/0060179 | A1 | 3/2009 | Schneider |
| 2009/0060180 | A1 | 3/2009 | Schneider |
| 2009/0195370 | A1 | 8/2009 | Huffman et al. |
| 2009/0214024 | A1 | 8/2009 | Schneider |
| 2009/0220083 | A1 | 9/2009 | Schneider |
| 2009/0279690 | A1* | 11/2009 | Michaels et al. ............... 380/28 |
| 2009/0292752 | A1 | 11/2009 | Schneider |
| 2010/0135486 | A1 | 6/2010 | Schneider |
| 2011/0213819 | A1 | 9/2011 | Douguet et al. |

OTHER PUBLICATIONS

"Data Encryption Standard (DES)", *Federal Information Processing Standards Publication 46-2*, http://www.itl.nist.gov/fipspubs/fip46-2.htm, (Dec. 30, 1993), 16 pages.
"Red Hat Office Action for U.S. Appl. No. 12/074,012 mailed Sep. 3, 2010".
Mirza, Fauzan, "Block Ciphers and Cryptanalysis", (Mar. 1998), 1-27.
Rose, Greg, "A Stream Cipher Based on Linear Feedback over GF($2^8$)", *Springer-Verlag Berlin Heidelberg*, C. Boyd and E. Dawson: ACISP '98, LNCSI1438, (1998), pp. 135-145.
Shannon, C E., "Communication Theory of Secrecy Systems", *Bell System Technical Journal*, vol. 28(4), (1949), pp. 656-715.
Tan, Chih Jeng K., "The PLFG parallel pseudorandom number generator", *Future Generation computer Systems* vol. 18, Issue 5, (Feb. 2002), pp. 693-698.
Barker, William C., "Recommendation for the Triple Data Encryption Algorithm (TDEA) Block Cipher", National Institute of Standards and Technology, Technology Administration U.S. Department of Commerce, Information Security, NIST Special Publication 800-67, Version 1.1, Revised May 19, 2008, (May 2004), 40 pages.
Bauer, Friedrich L., "8. Transposition Ciphers", Decrypted Secrets, 2nd edition, (2000), 16 pages.
Belal, Ahmed A., et al., "2D-Encryption Mode" Mar. 2001, 32 pages.
Bellare, M., et al., "A Conventional Authenticated-Encryption Mode" Submission to National Institute of Standards and Technology, Apr. 13, 2003, 14 page.
Bellare, M., et al., "The FFX Mode of Operation for Format-Preserving Encryption" Feb. 20, 2010, pages.
Black, John, et al., "A Suggestion for handling Arbitrary-Length Messages with the CBC MAC", Aug. 2001, 3 pages.
"Blum Blum Shub" from Wikipedia, the free encyclopedia. http://en.wikipedia.org/wiki/Blum_Blum_Shub. Aug. 9, 2007, 2 pages.
Brier, Eric, et al., "BPS: a Format-Preserving Encryption Proposal" 11 pages, Ingenico, France. Published at the following website Apr. 2010, http://csrc.nist.gov/groups/ST/toolkit/BCM/modes development.html.
Cohen, Bram, "AES-hash" May 2, 2001, 4 pages.
"Data Encryption Standard (DES)", U.S. Department of Commerce/National Institute of Standards and Technology, FIPS PUB 46-3, Reaffirmed Oct. 25, 1999, 26 pages.
Dworkin, Morris, "Recommendation for Block Cipher Modes of Operation—Galois/Counter Mode (GCM) and GMAC" National Institute of Standards and Technology, Technology Administration U.S. Department of Commerce, Information Security, NIST Special Publication 800-38D, Nov. 2007, 39 pages.
Dworkin, Morris, "Recommendation for Block Cipher Modes of Operation—Methods and Techniques" National Institute of Standards and Technology, Technology Administration U.S. Department of Commerce, Information Security, NIST Special Publication 800-38A, 2001, 66 pages.
Dworkin, Morris, "Recommendation for Block Cipher Modes of Operation—The CCM Mode for Authentication and Confidentiality" National Institute of Standards and Technology, Technology Administration U.S. Department of Commerce, Information Security, NIST Special Publication 800-38C, May 2004, updated 2007, 27 pages.
Dworkin, Morris, "Recommendation for Block Cipher Modes of Operation—the CMAC Mode for Authentication" National Institute of Standards and Technology, Technology Administration U.S. Department of Commerce, Information Security, NIST Special Publication 800-38B, May 2005, 25 pages.
Dworkin, Morris, "Recommendation for Block Cipher Modes of Operation—the XTS-AES Mode for Confidentiality on Storage Devices" National Institute of Standards and Technology, Technology Administration U.S. Department of Commerce, Information Security, NIST Special Publication 800-38E, Jan. 2010, 12 pages.
"Finite Field" from Wikipedia, the free encyclopedia. http://en.wikipedia.org/wiki/Galois_field. Aug. 10, 2007, 5 pages.
Fischer, Viktor, "Realization of the Round 2 AES Candidates Using Altera FPGA", (2000), pp. 1-15.
Gligor, Virgil D., et al., "Fast Encryption and Authentication: XCBC Encryption and EXCB Authentication Modes" Mar. 30, 2001 (Apr. 20, 2001, revision), 64 pages, retrieved from http://csrc.nist.gov/groups/ST/toolkit/BCM/modes_development.html.
Gligor, Virgil D., et al., "On Message Integrity in Symmetric Encryption" Nov. 10, 2000, 41 pages. VDG Inc., Maryland.
Håstad, Johan, et al., "Key Feedback Mode: a Keystream Generator with Provable Security" Oct. 11, 2000, 23 pages, Stockholm, Sweden.
Hellstrom, Henrick, "Propagating Cipher Feedback mode" 2001, 4 pages.
Housely, Russ, et al., "Counter with CBC-MAC (CCM)—AES Mode of Operation" RSA Laboratories, Submission to National Institute of Standards and Technology, Jun. 3, 2002, 9 pages.
Iwata, Tetsu, et al., "OMAC: One-Key CBC MAC" Dec. 20, 2002, 32 pages.
Jaulmes, Antoine Joux, et al., "On the Security of Randomized CBC-MAC Beyond the Birthday Paradox Limit a New Construction" 2002, 15 pages, DCSSI Crypto Lab.
Jutla, Charanjit S., "Encryption Modes with Almost Free Message Integrity" IBM T.J. Watson Research Center, New York, 2001, 6 pages.
Jutla, Charanjit S., "Parallelizable Encryption Mode with Almost Free Message Integrity" IBM T.J. Watson Research Center, 2000, 23 pages.
Knudsen, Lars R., "Reports in Informatics—Block Chaining modes of operation" Oct. 2000, 16 pages, Report No. 207, Department of Informatics, University of Bergen, Bergen, Norway,.
Kohno, Tadayoshi, et al., "The CWC Authenticated Encryption (Associated Data) Mode" May 27, 2003, 18 pages, Submission to National Institute of Standards and Technology,.
Kurosawa, Kaoru, et al., "TMAC: Two-Key CBC MAC" Jun. 21, 2002, 18 pages.
Lipmaa, Helger, et al., "Comments to NIST concerning AES Modes of Operations:" CTR-Mode Encryption 2000, 4 pages.
Mattsson, Ulf T., "Format-Controlling Encryption using Datatype-Preserving Encryption" Jun. 30, 2009, 46 pages, Protegrity Corporation.
McGrew, David A., et al., The Galois/Counter Mode of Operation (GCM) Submission to National Institute of Standards and Technology, May 31, 2005, 44 pages.
Rogaway, Phillip, "PMAC—Proposal to NIST for a parallelizable message authentication code" Apr. 1, 2001, 27 pages.
Rogaway, Phillip, et al., "OCB: A Block-Cipher mode of operation for Efficient Authenticated Encryption" Aug. 3, 2001, 36 pages.
Rogaway, Phillip, et al., "The SIV Mode of Operation for Deterministic Authenticated-Encryption (Key Wrap) and Misuse-Resistant

(56) References Cited

OTHER PUBLICATIONS

Nonce-Based Authenticated-Encryption" Aug. 20, 2007, 3 pages, retrieved from http://csrc.nist.gov/groups/ST/toolkit/BCM/modes_development.html.
RSA, "What is Cipher Block Chaining Mode?" Mar. 3, 2007 from Internet Archive WayBack machine. http://web.archive.org/web/20070303121357/http://www.rsa.com/rsalabs/node.asp?id=2171.
"Secure Cryptoprocessor" from Wikipedia, the free encyclopedia. http://en.wikipedia.org/wiki/Secure_cryptoprocessor. Aug. 10, 2007, 3 pages.
Schroeppel, Richard C., et al., "Cipher-State (CS) Mode of Operation for AES" Sandia National Laboratories, Submission to National Institute of Standards and Technology, May 7, 2004, 8 pages.
Schneier, "Applied Cryptography", John Wiley and Sons, 2nd Edition, (1996), p. 319.
"Transposition cipher", Wikipedia, the free encyclopedia, http://en.wikipedia.org/wiki/Transposition_cipher, accessed May 8, 2007, 8 pages.
Wolfram Math World, Primitive Polynomials, http://mathworld.wolfram.com/primitivepolynomial.html, pp. 1-2, Feb. 9, 2006 from Internet Archive WayBack Machine.
Red Hat Office Action for U.S. Appl. No. 11/807,261 mailed Jul. 19, 2010.
Red Hat Office Action for U.S. Appl. No. 11/897,411 mailed Sep. 2, 2010.
Red Hat Office Action for U.S. Appl. No. 11/897,414 mailed Sep. 2, 2010.
Red Hat Office Action for U.S. Appl. No. 12/072,069 mailed Sep. 2, 2010.
Red Hat Office Action for U.S. Appl. No. 12/325,228 mailed Sep. 3, 2010.
McLauchlin, Apr. 6, 2007, "Random Number Generation for Cryptography," http://imps.mcmaster.ca/courses/SE-4CO3-07/wiki/mclaucwj/Random_Number_Generation_for_Cryptography.html, pp. 103.
Schroeppel, Richard C., et al., Cipher-State (CS) Mode of Operation for AES: Sandia National Laboratories, Submission to National Institute of Standards and Technology, May 7, 2004, 8 pages.
Schneier, Bruce. "Applied Cryptography" 1996, John Wiley and Sons, 2nd Edition, p. 237.
Notice of Allowance for U.S. Appl. No. 11/807,261, mailed Dec. 14, 2010.
Notice of Allowance for U.S. Appl. No. 12/074,012, mailed Jan. 11, 2011.
Red Hat Notice of Allowance for U.S. Appl. No. 11/807,261 Mailed Feb. 28, 2011.
Red Hat Office Action for U.S. Appl. No. 12/154,465, mailed Dec. 28, 2011.
Red Hat Office Action for U.S. Appl. No. 11/897,411 Mailed Jan. 5, 2011.
Red Hat Office Action for U.S. Appl. No. 11/897,411, mailed Dec. 21, 2011.
Red Hat Office Action for U.S. Appl. No. 11/897,411, mailed Aug. 26, 2011.
Red Hat Office Action for U.S. Appl. No. 11/897,414 Mailed Dec. 1, 2011.
Red Hat Office Action for U.S. Appl. No. 11/897,414 Mailed Dec. 28, 2010.
Red Hat Office Action for U.S. Appl. No. 12/072,069, mailed Oct. 3, 2011.
Red Hat Office Action for U.S. Appl. No. 12/072,069, mailed Jan. 5, 2011.
Red Hat Office Action for U.S. Appl. No. 12/072,069, mailed Apr. 29, 2011.
Red Hat Office Action for U.S. Appl. No. 12/072,069, mailed Feb. 22, 2012.
Red Hat Notice of Allowance for U.S. Appl. No. 12/074,012 Mailed Jan. 11, 2011.
Red Hat Office Action for U.S. Appl. No. 12/154,465, mailed Aug. 19, 2011.
Red Hat Office Action for U.S. Appl. No. 12/154,465, mailed Jan. 7, 2011.
Red Hat Office Action for U.S. Appl. No. 12/154,465, mailed Sep. 20, 2010.
Red Hat Office Action for U.S. Appl. No. 12/325,228, mailed Oct. 14, 2011.
Red Hat Office Action for U.S. Appl. No. 12/325,228, mailed Feb. 4, 2011.
Schneier, Bruce. "Applied Cryptography", 2nd Edition, Chapter 17, pp. 417-418.
"Blum Blum Shub Generator" from httpws:www.cs.indiana.edu/~kapadia/project2/node11.html, 1 page May 30, 2011.
Entacher, Karl, "Appendix: Linear Recurrences", Jun. 16, 2012, pp. 103 from http://random.mat.sbg.ac.at/results/karl/server/node11.html.
Stein, "Visualizing Galois Fields", May 17, 2012, pp. 1-11 from http://nklein.com/2012/05/visualizing-galois-fields/.
USPTO; Office Action for U.S. Appl. No. 11/897,411, mailed May 9, 2012.
USPTO; Office Action for U.S. Appl. No. 11/897,411, mailed Sep. 13, 2012.
USPTO; Office Action for U.S. Appl. No. 11/897,411, mailed Mar. 14, 2013.
USPTO; Notice of Allowance for U.S. Appl. No. 11/897,414 mailed May 10, 2012.
USPTO; Office Action for U.S. Appl. No. 12/072,069, mailed Jun. 27, 2012.
USPTO; Notice of Allowance for U.S. Appl. No. 12/072,069, mailed Dec. 6, 2012.
USPTO; Office Action for U.S. Appl. No. 12/325,228, mailed Apr. 12, 2012.
USPTO; Notice of Allowance for U.S. Appl. No. 12/325,228, mailed Sep. 14, 2012.
USPTO; Office Action for U.S. Appl. No. 12/154,465, mailed May 4, 2012.
USPTO; Office Action for U.S. Appl. No. 12/154,465, mailed Sep. 19, 2012.
USPTO; Office Action for U.S. Appl. No. 12/154,465, mailed Dec. 17, 2012.

* cited by examiner

| | | | |
|---|---|---|---|
| 401 — SEQUENCE FROM FIRST SOURCE: | b0010 | 0000 (d32) | |
| 403 — SEQUENCE FROM SECOND SOURCE: | b1000 | 0000 (d128) | |
| 405 — MULTIPLICATION RESULT: | b0001 | 0000 0000 | 0000 (d4096) |
| 407 — SUBTRACT HIGH ORDER BITS FROM LOW ORDER BITS: | b0000 | 0000 - b0001 | 0000 |
| 409 — RESULT REPRESENTED IN TWO'S COMPLEMENT: | b1111 | 0000 (d-16) | |
| 411 — INCREMENT NEGATIVE RESULT: | b1111 | 0001 (d-15) | |
| 413 — $2^k-1$ WHERE k=8: | b1111 | 1111 | |
| 415 — 411 AND 413: | b1111 | 0001 (d241) | |
| 417 — OUTPUT RESULT: | b1111 | 0001 (d241) | |

FIG. 4

NON-LINEAR MIXING OF PSEUDO-RANDOM NUMBER GENERATOR OUTPUT

TECHNICAL FIELD

Embodiments of the present invention related to random number generation. Specifically, the embodiments of the present invention relate to a method and system for generating pseudo-random numbers by combining two pseudo-random numbers from separate pseudo-random number generators non-linearly.

BACKGROUND

Many applications utilize random numbers or sequences of random numbers. For example, ciphering algorithms utilize random number sequences as part of the enciphering process. However, the methods utilized to generate random numbers vary in the quality of their randomness. The quality of randomness is measured statistically to determine whether produced numbers are generated in correct proportions. True randomness also requires that the generated numbers are not predictable. Computer algorithms are not able to easily generate numbers that approximate true randomness and instead computer algorithms generate pseudo-random numbers. Pseudo-random number generators attempt to approximate the generation of true random numbers.

Generally, fast and simple pseudo-random number generation algorithms can be identified by a statistical analysis of their output (i.e., the statistical analysis reveals the specific algorithm that generated a set of pseudo-random numbers), which can jeopardize the function of the application that relies on the generator. For example, a ciphered number can be decrypted if the pseudo-random number sequence on which it is based can be determined. Stronger random number generators tend to be slower or more resource intensive making them impractical for many applications.

As a result, many applications that rely on pseudo-random numbers or sequences must incorporate a design decision that accepts the poorer random qualities of faster algorithms or that accepts higher resource requirements and slower speeds to obtain better random qualities. For example, enciphering algorithms like RC4, which is relied upon in enciphered communication protocols such as secured socket layer (SSL) have weaknesses due to their random number generation (e.g., RC4 has key scheduling weaknesses that are discernable for thousands of bytes after a rekeying operation), but the enciphering algorithms must be fast or they hinder the performance of the communications they encipher.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIG. 4 is a diagram of one example execution of the process for mixing two pseudo-random numbers or sequences.

DETAILED DESCRIPTION

Described herein is a method and apparatus for a pseudo-random number generation system. The pseudo-random number generation mixes the output of two or more pseudo-random number generators to create a new pseudo-random number or sequence. The process operates on pseudo-random numbers with a bit size k and multiplies these pseudo-random numbers modulo $2^k+1$. This process can be performed quickly and with minimal computing resources, while improving the quality of the randomness of the output.

Figure 1:
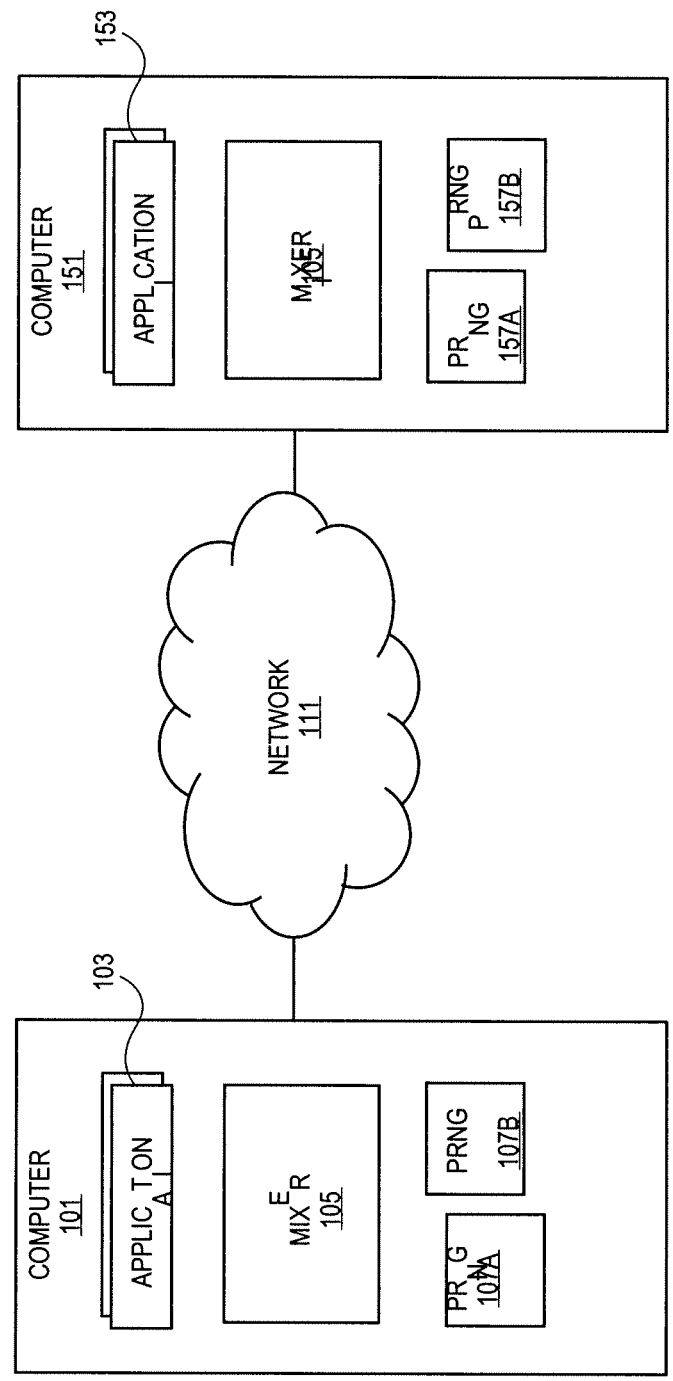
FIG. 1 is a diagram of one embodiment of a system for pseudo-random number generation.

FIG. 1 is a diagram of one embodiment of a system for pseudo-random number generation. In one embodiment, the system includes at least one computer 101. The computer 101 can be a desktop computer, laptop computer, handheld device, cellular phone, server, console device, wireless device or similar device. The computer can include any number of applications 103, a mixer 105, any number of pseudo-random number generators (PRNG) 107A,B or similar components.

The applications 103 can be any type of programs such as word processing programs, video games, ciphering programs, communication programs or similar programs. Any number of the applications 103 can rely on or utilize pseudo-random numbers. These pseudo-random numbers are generated by the mixer 105 based on input from the pseudo-random number generators 107A,B. The applications 103 can request pseudo-random numbers having any size, any length of sequence, any range or similar characteristics. In some cases, the applications 103 need continuous or long sequences of pseudo-random numbers. In other cases, the applications need pseudo-random numbers of fixed size.

The mixer 105 is a program, hardware device or similar component of the computer 101 that services requests for pseudo-random numbers from the applications 103 or other programs. The mixer 105 can provide discrete pseudo-random numbers or streaming pseudo-random numbers. The mixer 105 communicates with any number of pseudo-random number generators 107A,B to generate the pseudo-random number output that is provided to the applications 103. An application 103 or user can access, invoke or call the mixer 105. The number and type of the pseudo-random number generators 107A,B to be utilized as input can be specified by a calling application 103, set by a programmer, configured by a user or administrator or similarly determined. Desired characteristics of the output generated by the mixer 105 can also be specified by an application, user, programmer, administrator or similar entity.

Any number, type and variety of pseudo-random number generators 107A,B can be present in the computer system 101 as programs, hardware devices or other types of computer components. Pseudo-random number generators 107A,B can be based on the Mersenne Twister algorithm, Blum Blum Shub algorithm, lagged Fibonacci algorithm, linear feedback shift registers, linear congruential generators, generalized feedback shift registers or similar generators and algorithms. Some cryptographically secure generators include CryptGenRandom by MICROSOFT, the Yarrow algorithm or similar algorithms and programs.

In one embodiment, the computer system 101 is part of a network 111 with other computer systems 151. The network 111 can enable a distributed or networked implementation of the pseudo-random number generation. The mixer 105 on the computer system 101 can be accessed and utilized by remote computers 151 and applications 153 or the applications 103 on the computer system 101 can access a mixer 155 on another computer 151. Similarly, pseudo-random number generators 107A,B on the computer 101 can be accessed by a mixer 155 on another computer 151 and the mixer 105 on the computer 101 can access pseudo-random number generators 157A,B on another computer 151.

The network 111 can be any type of network including a local area network (LAN), a wide area network (WAN), such as the Internet, or a similar network. The network 111 can included wired and/or wireless components. Any number of computers 101, 151 and their components such as the mixers 105, 155 can communicate over the network 111.

Figure 2:
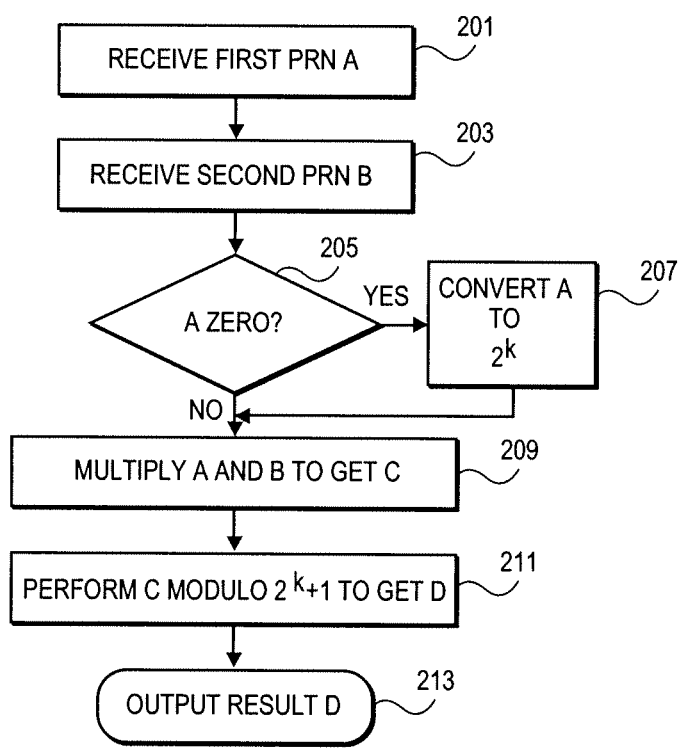
FIG. 2 is a flowchart of one embodiment of a process for mixing two pseudo-random numbers or sequences.

FIG. 2 is a flowchart of one embodiment of a process for mixing two pseudo-random number sequences. In one embodiment, the illustrated process is executed by a mixer. The process can be initiated by an application that is requesting a pseudo-random number or a sequence of random numbers. The application or user can also specify other parameters or similarly configure the process to generate a number with desired characteristics. For example, the application can specify particular pseudo-random number generators to be utilized as input. The mixer can utilize received parameter information or stored configuration information that specifies characteristics related to the available hardware and implementation of the process. For example, the process can be configured to utilize either 8-bit or 16-bit pseudo-random number inputs. These input sizes can be based on register sizes in the computer system.

In one embodiment, after initiation in response to a user or application request, the process obtains a first pseudo-random number from a first pseudo-random number generator (block 201). The size of the number obtained from the first pseudo-random number generator can be a default size, specified by a user or determined based on stored configuration information. The process also obtains a second pseudo-random number from a second pseudo-random number generator (block 203). The second pseudo-random number input can have any size matching the size of the first pseudo-random number input. The retrieval of the two pseudo-random numbers can be done in parallel or in any relative order. Any two pseudo-random number generators can be utilized to obtain the pseudo-random number inputs.

In some embodiments, a check may be performed to determine whether one of the pseudo-random numbers is zero (block 205). Since the numbers are to be multiplied together and a full range of numbers is to be represented for a given size of the pseudo-random numbers (i.e., a typical k-bit number can only represent $2^k-1$ numbers instead of a full range of $2^k$ numbers, i.e., 0 to $2^k$ can be represented instead of 0 to $2^k-1$ or 1 to $2^k$) one of the input pseudo-random numbers is converted to $2^k$ when it is zero (block 207).

After the representation of the pseudo-random numbers has been corrected to ensure that a full range of numbers from 0 to $2^k$ can be represented, the process multiplies the two received input numbers (block 209). The result of the multiplication is then further modified by performing a modulo operation with the operand $2^k+1$. The result of the multiplication and modulo operation is then output as the random number (block 213). This process is computationally fast to execute and improves the randomness of the pseudo-random numbers over either of the pseudo-random number generators that are utilized to obtain the input pseudo-random numbers.

Figure 3:
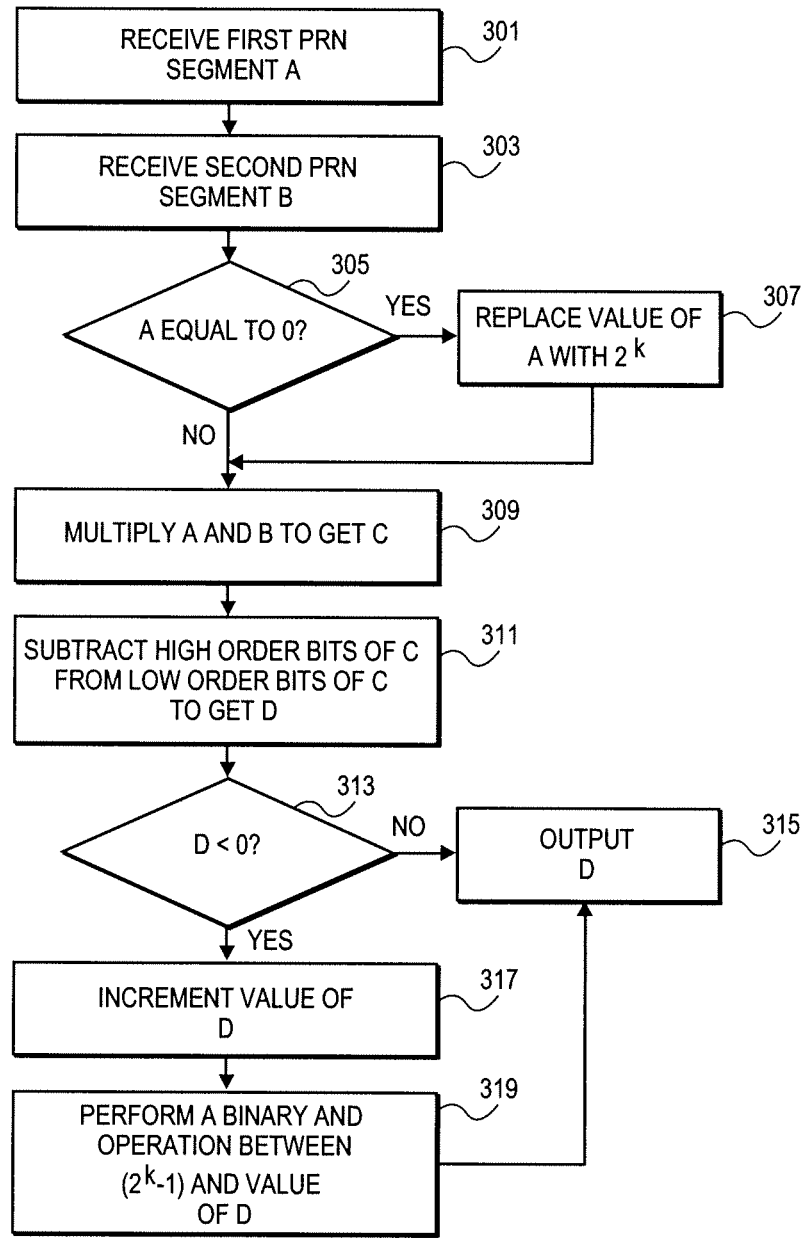
FIG. 3 is a flowchart of one example implementation of the process for mixing two pseudo-random numbers or sequences.

FIG. 3 is a flowchart of one example implementation of the process for mixing two pseudo-random number sequences. The example embodiment is a specific implementation that is designed to optimize the mixer process for a bit size k, which is either 8 or 16 to handle either 8-bit or 16-bit pseudo-random number input sources. The process can be initiated by a request from an application or user. The request or configuration information can specify bit size, the pseudo-random number generators to be queried for input and similar parameters of the process.

The process obtains a first pseudo-random number or sequence A of the designated size k from the first pseudo-random number generator (block 301). The first pseudo-random number or sequence is obtained from a default or designated pseudo-random number generator. The process also obtains a second pseudo-random number or sequence B of the designated size k from the second pseudo-random number generator (block 303). The second pseudo-random number generator is a default or designated pseudo-random number generator. The retrieval of the two pseudo-random numbers or sequences can take place in parallel or in any relative order.

A check is made to determine if one of the two pseudo-random numbers is zero (block 305). If the tested value is zero, then its value is replaced with $2^k$ (for example, 256 for k=8, or 65536 for k=16). This test and replacement of a zero value removes the possibility of biasing the output result towards zero and ensures a proper statistical distribution. The second of the two pseudo-random numbers is not checked and possibly replaced. The zero check is to correct the range issue so that a full range of numbers is represented from 0 to $2^k$ (i.e., 0 to either 256 or 65536, for k=8 or 16, respectively) and thus the proper statistical distribution of random numbers is maintained. If the tested number is a zero then it is replaced with the number $2^k$ (i.e., either 256 or 65536) (block 307). If the tested number is not a zero it is not changed. In other embodiments, the full range of numbers representation check and conversion is not utilized. In this embodiment, either the hardware or software representation allows for the representation of the full range or another analogous correction is made to ensure the proper statistical distribution of the output.

After the number representation correction is completed, the two pseudo-random numbers or sequences A and B are multiplied together to produce a result C (block 309). The multiplication result is then divided into two halves of the same bit size k. If the higher order bits are less than k in number, then they are padded with leading zeros. If the data is accessible directly from the registers or analogous devices like accumulators, then the data in the k sized sections is directly manipulated. The high order bits of the result C are subtracted from the lower order bits of the result C to obtain a result D (block 311). This subtraction of the high order bits from the lower order bits is equivalent to the modulo operation mod $2^k+1$ on the result D.

The result D is checked to determine whether the number is negative (block 313). If the result D is not negative, then the result D is output as the new pseudo-random number (block 315). The number can be returned to the calling application or similarly output. If the result is negative, then the result is corrected to be a positive number. To correct the negative result, the result D is incremented (block 317). Then, the number $2^k-1$ is combined with the incremented result D using a binary AND operation (block 319). This AND operation is utilized on values represented in the two's complement format. If k coincides with the size of a register in which the operation is performed, then the operation can be accomplished by ignoring overflow. The result of the AND operation will be a positive number that can be output as the new pseudo-random number (block 315).

A partial example x86 processor assembly language implementation of the multiplication and modulo portions of the above process can be expressed as:

| | | |
|---|---|---|
| a. IMUL | AL, AH | ; Unsigned multiply of AH into AL |
| b. SUB | AL, AH | ; Subtract AH from AL |
| c. SBB | AH, AH | ; Subtract AH from itself, with borrow (result will be either 0 or −1) |
| d. SUB | AL, AH | ; Subtract AH from AL to add the carry bit to AL | where AL and AH are the low 8-bits and the high 8-bits of an accumulator, respectively.

In an alternative implementation, the subtraction (SUB) instruction is followed by a branch on carry instruction and increment instruction. The above implementation is faster overall because the multiplication instruction (IMUL) is slow enough to enable the processor to load the instruction queue with the next several instructions, which can be decoded and ready to execute by the time the multiplication instruction completes. In contrast, the alternative embodiment with the conditional branch would require a prediction of the branch outcome. This prediction would be wrong approximately fifty percent of the time, resulting in the predicted instruction sequence being discarded and the other sequence fetched. This makes the alternative embodiment, more than twice as long to execute on a failed prediction.

The process can also be implemented in higher level languages. An example implementation in C or JAVA for 8-bit registers:

res=source1*source2% 257;

or for 16-bit registers:

res=source1*source2% 65537;

In another embodiment, instead of executing the process as a set of instructions that operate on the input pseudo-random numbers a look-up table can be utilized where the input pseudo-random numbers are utilized to look up a result. This is most practical as an implementation for smaller input number bit sizes such as the 8-bit pseudo-random numbers or sequences.

FIG. 4 is a diagram of one example execution of the process for mixing two pseudo-random number sequences. The example execution of the process is illustrated as a set of lines 401-417. The process receives the first binary bit sequence with a decimal value of 32. The second binary bit sequence has a decimal value of 128 (line 403).

Multiplication of the two numbers (32 and 128) generates a binary number that has a decimal value of 4096 (line 405). The high order bits are then subtracted from the lower order bits (line 407). The result of the subtraction (−16 decimal) is represented in 1111 0000 in two's complement form (line 409). If the result had been positive it would have been output as the final result.

Because the result of the subtraction is negative, the result is inverted to the complementary positive number by first incrementing the number (line 411). After incrementing the result, now decimal −15, the number $2^k-1$ (line 413) is combined with the result −15 using the AND operation (line 415). The result of the AND operations is decimal 241, which is output as the result (line 417).

This implementation is provided by way of example and demonstrates an optimized execution of the formula AB mod $2^k+1$, where A is the first pseudo-random number having a bit size k, B is the second pseudo-random number with bit size k and k is either 8 or 16. This particular formula is fast to execute because the modulo can be executed as a subtraction instead of a division, which is more computationally intensive.

Figure 5:
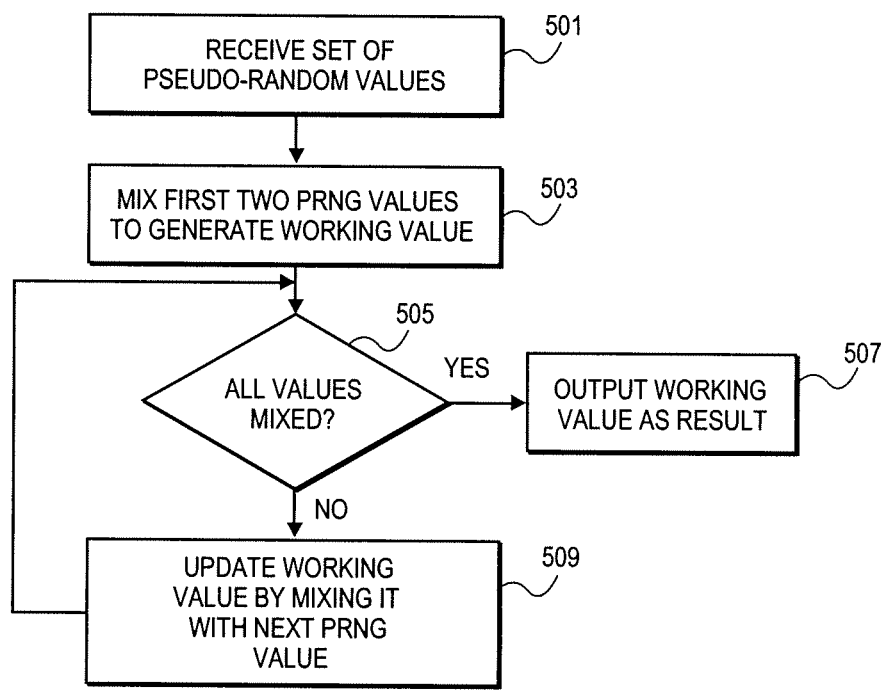
FIG. 5 is a flowchart of one embodiment of a process for mixing a set of pseudo-random numbers or sequences.

FIG. 5 is a flowchart of one embodiment of a process for mixing a set of pseudo-random numbers. The process of mixing pseudo-random numbers can also be performed using more than two pseudo-random sources. The process combines the first two sources and then progressively combines each additional source with the result of the last combination. The process can receive any number of pseudo-random numbers as inputs (block 501). The pseudo-random numbers can be from any number of separate pseudo-random number generators. These numbers can be received in any order including in parallel with one another.

The first two pseudo-random numbers are combined using the process described above in regard to FIGS. 2-4 to generate a working value (block 503). Any known or fixed order of the pseudo-random generator sources or numbers can be used in the mixing process. After the first and second pseudo-random numbers from the first two pseudo-random number generators are combined, a check is made to determine if all of the designated pseudo-random numbers or generators have been properly combined (block 505). If all of the sources or designated generators' input have been combined, then the working value is returned as the final pseudo-random number to the application or user that called the mixer (block 507).

However, if additional pseudo-random numbers from additional pseudo-random number generators remain to be combined with the working value, then the process described above in regard to FIGS. 2-4 is applied with the first pseudo-random number being the working value and the second pseudo-random number being from the next pseudo-random number generator (block 509). A check is then made to determine if all of the pseudo-random numbers and pseudo-random number generators have been mixed. If all generators and pseudo-random numbers have been mixed, then the working value is output as the final pseudo-random number or sequence (block 507). If not, the process continues until all of the designated numbers or generators have been mixed together and then the working value is output as the result.

In one embodiment, a check is also made of at least one pseudo-random number or pseudo-random number generator during the combination process to determine whether the value or output from the generator is a zero value. Only one pseudo-random number input or generator utilized in the mixing process can be allowed to generate a zero value. All other pseudo-random number generators or inputs are adjusted such that a zero value is replaced with the value $2^k$.

Figure 6:
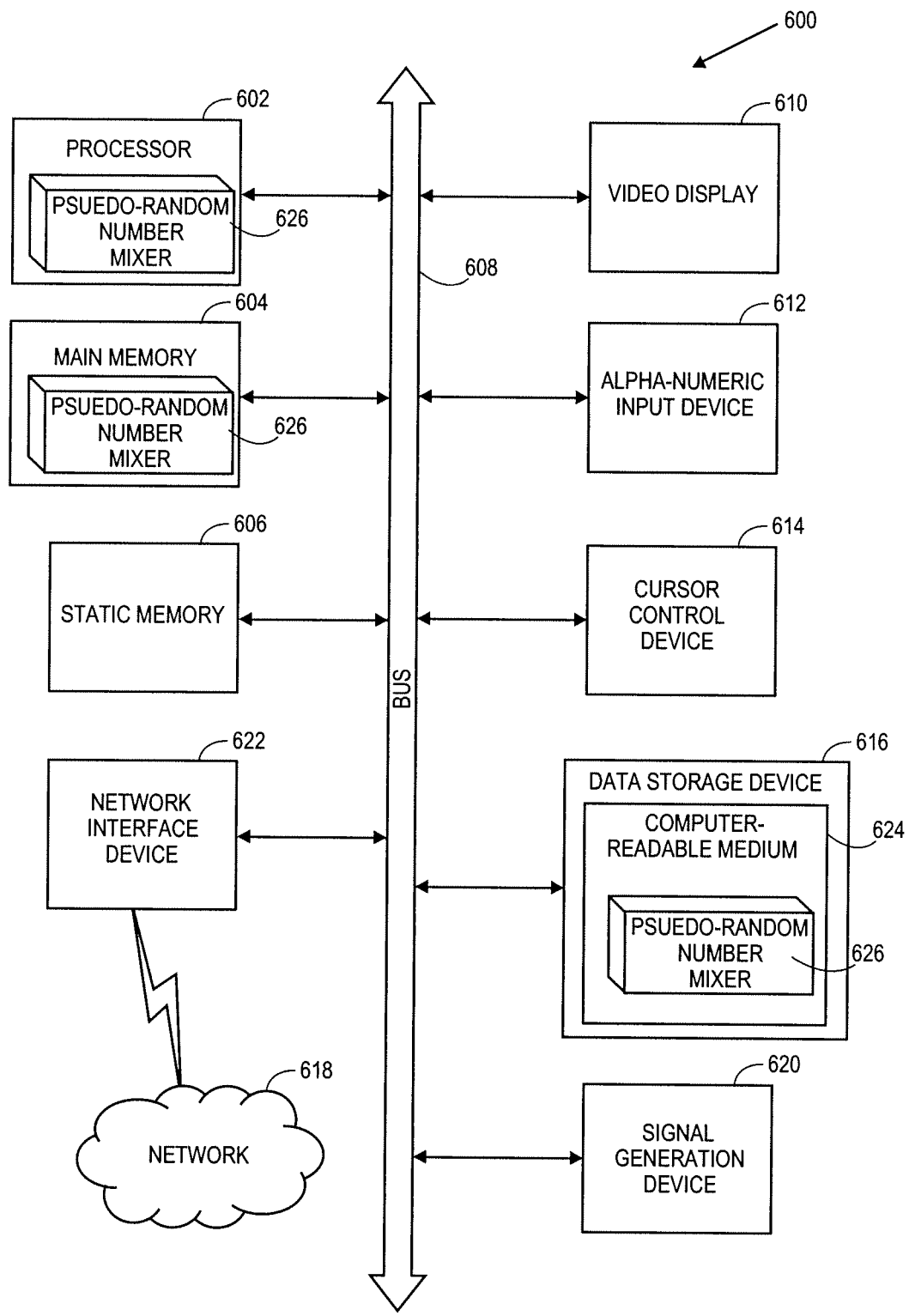
FIG. 6 is a diagram of one embodiment of a computer system for providing pseudo-random number or sequences generation through mixing of pseudo-random number generator outputs.

FIG. 6 is a diagram of one embodiment of a computer system for providing pseudo-random number generation through mixing of pseudo-random number generator outputs. Within the computer system 600 is a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine (e.g., a client computer executing the pseudo-random number mixer and the server computer executing the pseudo-random number generator(s)) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 616 (e.g., a data storage device in the form of a drive unit, which may include fixed or removable computer-readable medium), which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the pseudo-random number mixer 626 for performing the operations and steps discussed herein.

The computer system 600 may further include a network interface device 622. The computer system 600 also may include a video display unit 610 (e.g., a liquid crystal display (LCD) or a cathode ray tube (CRT)) connected to the computer system through a graphics port and graphics chipset, an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions (e.g., the pseudo-random number mixer 626) embodying any one or more of the methodologies or functions described herein. The mixer 626 may also reside, completely or at least partially, within the main memory 604 and/or within the processing device 602 during execution thereof by the computer system 600, the main memory 604 and the processing device 602 also constituting machine-readable storage media. The logic 626 may further be transmitted or received over a network 618 via the network interface device 622.

The machine-readable storage medium 624 may also be used to store the pseudo-random number mixer 626 persistently. While the machine-readable storage medium 624 is shown in an exemplary embodiment to be a single medium, the term "machine-readable storage medium" and also "computer-readable medium" should be taken to include a single medium or multiple media (e.g., a centralized or distributed database, and/or associated caches and servers) that store the one or more sets of instructions. The terms "machine-readable storage medium" and "computer-readable medium" shall also be taken to include any medium that is capable of storing or encoding a set of instructions for execution by the machine and that cause the machine to perform any one or more of the methodologies of the present invention. The terms "machine-readable storage medium" and "computer-readable medium" shall accordingly be taken to include, but not be limited to, solid-state memories, and optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing," "computing," "generating," "determining," "selecting," "displaying," "searching," "receiving," "updating," "modifying," "assigning," "requesting," "combining," "running," "correcting," "moving," "executing," "checking," "incrementing," "initiating," "returning," "retrieving," "encrypting," "truncating," "replacing," "calculating," "recalculating," "outputting," "performing," "multiplying" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer readable medium includes any mechanism for storing information in a form readable by a computer. For example, a computer readable medium includes read only memory ("ROM"), random access memory ("RAM"), magnetic disk storage media; optical storage media, flash memory devices or other type of machine-accessible storage media.

Thus, a method and apparatus for generating a pseudo-random number through the combination of two or more pseudo-random number generator outputs has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:
combining, by a processing device of a computer with a memory executing a pseudo-random number mixer, a first pseudo-random number received from a first source with a second pseudo-random number received from a second source non-linearly to generate a third pseudo-random number, the combining comprising:
performing multiplication based on the first pseudo-random number and the second pseudo-random number;
performing a modulo operation on a result of the multiplication, wherein the modulo operation has an operand that is based on a bit size of the first pseudo-random number, wherein the first pseudo-random number, the second pseudo-random number, and the third-pseudo-random number are a same bit size; and
outputting a result of the modulo operation as the third pseudo-random number; and
applying, by the processing device, the third pseudo-random number in a cipher operation.

2. The method of claim 1, wherein the operand for the modulo operation is $2^k+1$, where k is the bit size of the first pseudo-random number.

3. The method of claim 2, wherein k is any one of 8 or 16.

4. The method of claim 2, wherein the first pseudo-random number and the second pseudo-random number are binary values, and wherein the modulo operation is executed as a subtraction instead of as a division by subtracting a high order set of bits of the result of the multiplication from a low order set of bits of the result of the multiplication.

5. The method of claim 4, further comprising:
checking for a negative result from the subtracting of the high order set of bits from the low order set of bits; and
correcting the negative result to produce a positive result.

6. The method of claim 5, wherein correcting the negative result comprises:
incrementing the negative result; and
combining an incremented negative result with $2^k-1$ using an AND operation.

7. The method of claim 1, further comprising:
combining the third pseudo-random number with a fourth pseudo-random number to generate a fifth pseudo-random number.

8. The method of claim 1, wherein the first pseudo-random number source is any one of a lagged Fibonacci generator, a linear congruential generator, a linear feedback shift register or a generalized feedback shift register.

9. The method of claim 1, wherein the second pseudo-random number source is a generator implementing any one of an RC4 algorithm, a Blum Blum, Shub algorithm, a Fortuna algorithm, or a Mersenne Twister algorithm.

10. A computer readable storage memory, having instructions stored therein, which when executed by a processing device of a computer, cause the processing device to perform a set of operations comprising:
combining, by the processing device, a first pseudo-random number received from a first source with a second pseudo-random number received from a second source non-linearly to generate a third pseudo-random number, the combining comprising:
performing multiplication based on the first pseudo-random number and the second pseudo-random number;
performing a modulo operation on a result of the multiplication, wherein the modulo operation has an operand that is based on a bit size of the first pseudo-random number; and
outputting a result of the modulo operation as the third pseudo-random number.

11. The computer readable storage memory of claim 10, wherein the first pseudo-random number, the second pseudo-random number and the third pseudo-random number have the bit size of the first pseudo-random number.

12. The computer readable storage memory of claim 10, wherein the operand for the modulo operation is $2^k+1$, where k is the bit size of the first pseudo-random number.

13. The computer readable storage memory of claim 12, wherein the first pseudo-random number and the second pseudo-random number are binary values, and wherein the modulo operation is executed as a subtraction instead of as a division by subtracting a high order set of bits of the result of the multiplication from a low order set of bits of the result of the multiplication.

14. The computer readable storage memory of claim 13, having further instructions therein, which when executed by the processing device, cause the processing device to perform a further set of operations, further comprising:
checking for a negative result from the subtracting of the high order set of bits from the low order set of bits; and
correcting the negative result to produce a positive result.

15. The computer readable storage memory of claim 14, having further instructions therein, which when executed by the processing device, cause the processing device to perform a further set of operations, further comprising:
incrementing the negative result; and
combining an incremented negative result with $2^k-1$ using an AND operation.

16. The computer readable storage memory of claim 10, having further instructions therein, which when executed by the processing device, cause the processing device to perform a further set of operations, further comprising:
combining the third pseudo-random number with a fourth pseudo-random number to generate a fifth pseudo-random number.

17. The computer readable storage memory of claim 10, wherein the first pseudo-random number source is any one of a lagged Fibonacci generator, a linear congruential generator, a linear feedback shift register or a generalized feedback shift register.

18. The computer readable storage memory of claim 10, wherein the second pseudo-random number source is a generator implementing any one of an RC4 algorithm, a Blum Blum, Shub algorithm, a Fortuna algorithm, or a Mersenne Twister algorithm.

19. A system comprising:
a processing device;
a system memory coupled to the processing device;
a first pseudo-random number generator executed by the processing device;
a second pseudo-random number generator executed by the processing device; and
a pseudo-random number mixer executed by the processing device, the pseudo-random number mixer to combine a first output of the first pseudo-random number generator with a second output of the second pseudo-random number generator non-linearly, the combining comprising:
performing multiplication based on the first output and the second output;
performing a modulo operation on a result of the multiplication, wherein the modulo operation has an operand that is based on a bit size of the first pseudo-random number; and
outputting a result of the modulo operation as a pseudo-random number.

20. The system of claim 19, wherein the operand for the module operation is $2^k+1$, where k is a bit size of each segment.

21. The system of claim 20, wherein the pseudo-random number mixer performs the modulo operation by a subtraction operation.

22. The system of claim 21, wherein the pseudo-random number mixer corrects negative subtraction results with an increment operation and a binary AND operation.

* * * * *